United States Patent [19]
Komatsu et al.

[11] Patent Number: 5,382,823
[45] Date of Patent: Jan. 17, 1995

[54] SEMICONDUCTOR DEVICE AND METHOD FOR PRODUCTION THEREOF

[75] Inventors: Kiyoshi Komatsu; Takeshi Kudo, both of Kanagawa, Japan

[73] Assignee: Terumo Kabushiki Kaisha, Tokyo, Japan

[21] Appl. No.: 71,311

[22] Filed: Jun. 2, 1993

Related U.S. Application Data

[63] Continuation-in-part of Ser. No. 798,289, Nov. 25, 1991, abandoned.

[30] Foreign Application Priority Data

Nov. 27, 1990 [JP] Japan .................................... 2-323729

[51] Int. Cl.⁶ ..................... H01L 29/84; H01L 29/96
[52] U.S. Cl. ................................... 257/419; 257/417; 257/415
[58] Field of Search .................. 257/419, 417, 415

[56] References Cited

FOREIGN PATENT DOCUMENTS

| | | |
|---|---|---|
| 0360286 | 3/1990 | European Pat. Off. . |
| 3902628 | 8/1990 | Germany . |
| 56-164582 | 12/1981 | Japan . |
| 60-80281 | 5/1985 | Japan . |
| 60-97676 | 5/1985 | Japan . |
| 60-97677 | 5/1985 | Japan . |
| 2-138841 | 5/1990 | Japan . |
| 2-237166 | 9/1990 | Japan . |
| 2-240971 | 9/1990 | Japan . |

OTHER PUBLICATIONS

Article entitled "A Novel Four Electrode Electrochemical Etch-Stop Method for Silicon Membrane Formation" by Kleock et al. published Transducers '87 pp. 116–119, 1987.
Article entitled "The Mechanism of Anisotropic Silicon Etching and Its Relevance for Micromachining" by H. Seidel, published Transducers '87 pp. 120–125, 1987.
Research paper of Tohoku Branch Meeting of the Electricity related society of Japan (Shoji et al.), published in 1988 entitled Fundamental Research Relating to Formation of Thin Diaphragm by High Density Diffusion Using Borofilm.
Research paper of Tokoku-gakuin University (M. Kimura), vol. 20 No. 2 (May 1986), entitled Micro-Air-Bridge and Sensors.

*Primary Examiner*—Andrew J. James
*Assistant Examiner*—Stephen D. Meier
*Attorney, Agent, or Firm*—Frishauf, Holtz, Goodman & Woodward

[57] ABSTRACT

A semiconductor device includes a cavity portion formed in a supporting portion made of a semiconductor material so as to be surrounded by the supporting portion, and a silicon oxynitride film supported on one surface of the supporting portion so as to cover the cavity portion on the side of the one surface or a silicon oxynitride film supported on one surface of the supporting portion and so arranged as to form a bridged structure over the cavity portion. The composition of the silicon oxynitride film is selected in accordance with the material of the supporting portion. The former semiconductor device is produced by forming a silicon oxynitride film on one surface of a semiconductor substrate, forming an etching resistant film which has a pattern of a cavity portion, on another surface of the semiconductor substrate, and forming the cavity portion by selectively etching the semiconductor substrate using the etching resistant film as a mask until the formed cavity portion reaches said silicon oxynitride film. The latter semiconductor device is produced by the same process except that another step for patterning the silicon oxynitride film to form a bridge structure is included.

3 Claims, 3 Drawing Sheets

SEMICONDUCTOR DEVICE AND METHOD FOR PRODUCTION THEREOF

BACKGROUND OF THE INVENTION

This is a continuation-in-part of copending application Ser. No. 07/798,289, filed Nov. 25, 1991, which is now abandoned.

FIELD OF THE INVENTION

The present invention relates generally to a semiconductor device and a method for the production thereof. More specifically, the invention relates to a semiconductor device which has a three-dimensional structure, for example, a thin-film structure, such as a diaphragm for use in a pressure sensor or the like, or a bridged structure for use in an infrared sensor or the like, and to a method for the production of such a semiconductor device.

DESCRIPTION OF THE BACKGROUND ART in recent years, in the field of sensors and actuators, it has been attempted to manufacture new devices, such as infrared sensors using abridged structure (thermobolometers), high-sensitivity capacitive pressure sensors using a very thin diaphragm, humidity sensors and audible range-controllable acoustic elements, by forming precision mechanical structures having a size of several microns on a substrate made of a semiconductor material, such as silicon.

Conventionally, in a case where a diaphragm structure of silicon having a smaller thickness than several microns is formed using silicon as a material, etching processing has been performed using alkaline etchant for example. In this case, it is important to control the stop timing of etching which influences the accuracy in the etching processing. As methods for stopping the etching, so called p-n etch-stop technique using p-n junction bias, and etch-stop technique using high-density impurity diffusion have been used ("TRANSDUCERS '87" pages 116–125).

however, in a case where a thin diaphragm is formed by the etch-stop technique using the p-n junction bias, an expensive epitaxial wafer is needed. Furthermore, this technique requires to establish an electrical contact with the p-type part and the n-type part of a silicon wafer immersed in an electrolytic solution, and to form these electrodes insulated from the electrolytic solution. However, it is technically difficult to satisfy these requirements. In the case of the etch-stop technique using the high-density impurity diffusion, it is difficult to selectively diffuse impurities, and heat treatment must be performed at a high temperature for a long time. In addition, it is difficult to control the concentration of impurity in the direction of depth. Moreover, since this technique can not cause the etching to be completely stopped, it is difficult to form a desired structure with high accuracy.

It has been known to produce a diaphragm or a bridged structure by laminating a silicon oxide film (SiOx) and a silicon nitride film (SiNy) on a silicon substrate and by etching apart of the silicon substrate. In this method, it is required to accurately control the conditions for the formations of the silicon oxide film and the silicon nitride film so as to ensure the counter balance between the elongation stress of the silicon oxide film and the contraction stress of the silicon nitride film. However, this control is very difficult in realization, and the product tends to be broken due to unbalance between the stresses applied to the respective films. Therefore, it is difficult to improve the yield of the diaphragm or the bridged structure.

SUMMARY OF THE INVENTION

It is therefore a principal object of the present invention to eliminate the aforementioned disadvantage, and to provide a semiconductor device which has an improved yield of a diaphragm and a bridged structure, and a method for the production thereof.

In order to accomplish the aforementioned and other objects, according to one aspect of the present invention, a semiconductor device comprises: a supporting portion made of a semiconductor material; a cavity portion formed in the supporting portion so as to be surrounded by the supporting portion; and a silicon oxynitride film supported on one surface of the supporting portion so as to cover the cavity portion on the side of the one surface, wherein said silicon oxynitride has a composition expressed by the following formula $SiO_xN_y$, wherein x is 1 to 1.4, y is 0.56 to 0.77 and $x+y<2$.

According to the present invention, a method for the production of this semiconductor device comprises the steps of: forming a silicon oxynitride film on one surface of a semiconductor substrate, wherein said silicon oxynitride has a composition expressed by the following formula $SiO_xN_y$, wherein x is 1 to 1.4, y is 0.56 to 0.77 and $x+y<2$; forming an etching resistant film which has a pattern of a cavity portion, on another surface of the semiconductor substrate; and forming the cavity portion by selectively etching the semiconductor substrate using the etching resistant film as a mask until the formed cavity portion reaches the silicon oxynitride film.

According to another aspect of the present invention, a semiconductor device comprises: a supporting portion made of a semiconductor material; a cavity portion formed in the supporting portion so as to be surrounded by the supporting portion; and a silicon oxynitride film supported on one surface of the supporting portion and so arranged as to form a bridged structure over the cavity portion, wherein said silicon oxynitride has a composition expressed by the following formula $SiO_xN_y$, wherein x is 1 to 1.4, y is 0.56 to 0.77 and $x+y<2$.

According to the present invention, a method for the production of this semiconductor device comprises the steps of: forming a silicon oxynitride film on one surface of a semiconductor substrate, wherein said silicon oxynitride has a composition expressed by the following formula $SiO_xN_y$, wherein x is 1 to 1.4, y is 0.56 to 0.77 and $x+y<2$; forming an etching resistant film which has a pattern of a cavity portion, on another surface of the semiconductor substrate; patterning the silicon oxynitride film to form a bridge structure; and forming the cavity portion by selectively etching the semiconductor substrate using the etching resistant film as a mask until the formed cavity portion reaches the silicon oxynitride film.

BRIEF DESCRIPTION OF THE DRAWINGS

The present invention will be understood more fully from the detailed description given herebelow and from the accompanying drawings of the preferred embodiments of the invention. However, the drawings are not intended to imply limitation of the invention to a specific embodiment, but are for explanation and understanding only.

In the drawings:

FIG. 4is a graph showing a relationship between the $N_2/(N_2+N_2O)$ ratio and M/Si(M=O and/or N).

DESCRIPTION OF THE PREFERRED EMBODIMENT

A semiconductor device, according to the present invention, comprises a supporting portion made of a semiconductor material, a cavity portion formed in the supporting portion so as to be surrounded by the supporting portion, and a silicon oxynitride film supported on one surface of the supporting portion so as to cover the cavity portion on the side of the one surface. Such a semiconductor device may be produced by a method which comprises the steps of forming a silicon oxynitride film on one surface of a semiconductor substrate, forming an etching resistant film which has a pattern of a cavity portion, on another surface of the semiconductor substrate, and forming the cavity portion by selectively etching the semiconductor substrate using the etching resistant film as a mask until the formed cavity portion reaches the silicon oxynitride film.

The supporting portion may be selected from the group consisting of semiconductor substrates made of semiconductor materials, such as silicon and germanium, glass and sapphire ($Al_2O_3$). It is preferable to use a silicon substrate as the supporting portion since it is readily available and inexpensive.

The silicon oxynitride film (SiOxNy) has both properties of a silicon oxide film and a silicon nitride film. Therefore, it has good stress balance and permits a stable diaphragm structure or a bridged structure to be formed. The optimum conditions for the formation of this silicon oxynitride film vary in accordance with the kind of a substrate to be used, since thermal expansion coefficient of the film varies in accordance with the material of the substrate and the plane orientation thereof. The conditions also vary in accordance with the size (thickness, length, width and so forth) of the diaphragm or the bridged structure, or with the purpose for use of the semiconductor device. In the semiconductor device of the present invention, the composition of the silicon oxynitride film is set in accordance with the size and material of the supporting portion. With this construction, it is possible to provide a diaphragm or a bridged structure having the optimum film composition having a ratio of SiOxNy, where x is 1 to 1.4, y is 0.56 to 0.77 and x+y<2 in accordance with the composition of the supporting portion and with the purpose for use thereof.

A semiconductor device, according to the present invention, may also comprise a supporting portion made of a semiconductor material, a cavity portion formed in the supporting portion so as to be surrounded by the supporting portion, and a silicon oxynitride film supported on one surface of the supporting portion and so arranged as to form a bridged structure over the cavity portion. This semiconductor device may be produced by a method which comprises the steps of forming a silicon oxynitride film on one surface of a semiconductor substrate, forming an etching resistant film which has a pattern of a cavity portion, on another surface of the semiconductor substrate, patterning the silicon oxynitride film to form a bridge structure, and forming the cavity portion by selectively etching the semiconductor substrate using the etching resistant film as a mask until the formed cavity portion reaches the silicon oxynitride film.

The bridged structure patterning may be formed by various techniques, such as photolithography, electron beam patterning and ion beam etching. According to the present invention, the etching reaction can be accurately stopped on the boundary between the silicon oxynitride film and the semiconductor substrate when etching the semiconductor substrate to form the cavity portion. Therefore, these techniques may control the thickness of the diaphragm or the bridged structure by varying the thickness of the silicon oxynitride film to be formed, so that it is possible to improve the operational efficiency in the production of the semiconductor device.

Furthermore, according to the present invention, the etching resistant film to be formed on another surface of the semiconductor substrate may be made of a silicon oxynitride film. In this case, since two silicon oxynitrides are formed on both surface of the semiconductor substrate simultaneously with each other, it is possible to simplify the process for forming the etching resistant film.

The formation of the silicon oxynitride film may be performed by plasma CVD (chemical vapor deposition) method. In this case, monosilane ($SiH_4$), nitrogen ($N_2$) and nitrous oxide ($N_2O$) may be used as a reaction gas. The stoichiometric composition x, y of the silicon oxynitride (SiOxNy) film to be formed may be controlled by varying the flow rat ratio of $N_2$ and $N_2O$ gases ($N_2/N_2+N_2$)). Thus the ratio of $N_2/(N_2+N_2O)$ should be in the rage of 0.85 to 0.88, preferably 0.86 to 0.87.

In the method for the production of a semiconductor device, according to the present invention, the reaction gases are fed to the semiconductor substrate during the formation of the silicon oxynitride film, and the flow rate ratio of the reaction gases may be varied to control the composition of the silicon oxynitride film. Therefore, it is possible to provide a structure having the optimum film composition in accordance with the composition of the semiconductor device and with the purpose for use thereof.

Furthermore, although monosilane ($SiH_4$), nitrogen ($N_2$) and nitrous oxide ($N_2O$) gases may used as the reaction gases, other gases containing an element Si, N or O may be used. For the patterning of the silicon oxynitride film, not only the wet etching method using a buffered hydrofluoric acid, but also the dry etching method, such as the reactive ion etching (RIE) method, may be used.

According to the present invention, the method for the formation of the silicon oxynitride film is not limited to the plasma CVD method, and other methods, such as the spattering method, may be used. In this spattering method, the silicon oxynitride film may be formed by using, for example, silicon oxide as a target. In this case, the composition of the silicon oxynitride film can be varied by suitably adding nitrogen ($N_2$) and/or oxygen ($O_2$) to the spattering as, such as argon (Ar).

Figure 1:
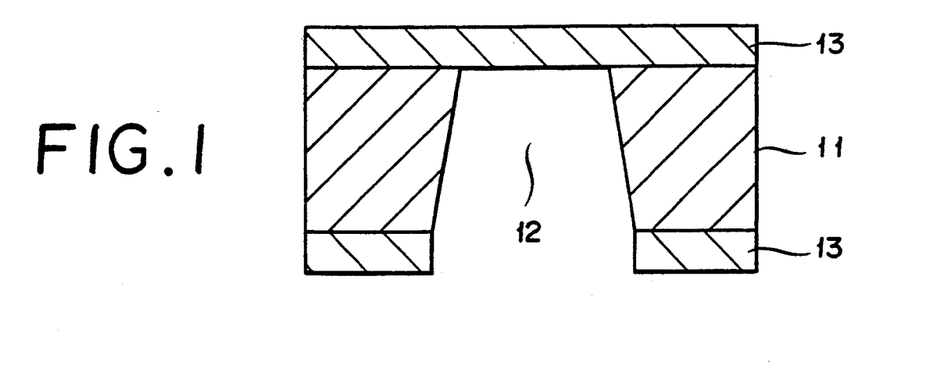
FIG. 1 is a longitudinal cross section of the preferred embodiment of a diaphragm structure according to the present invention.
Figure 3:
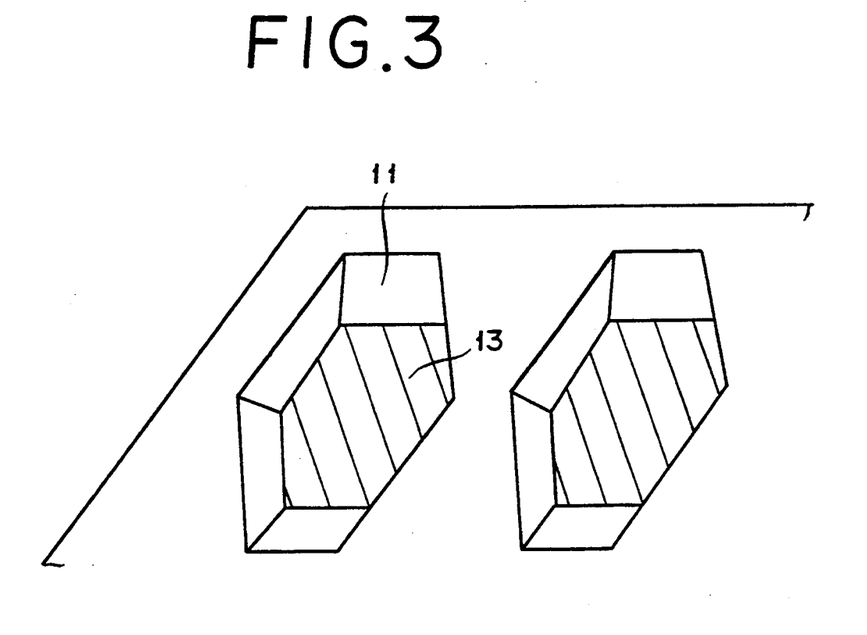
FIG. 3 is a perspective view of the diaphragm structure of FIG. 1.

FIGS. 1 and 3 illustrate the preferred embodiment of a diaphragm structure, according to the present invention. This diaphragm structure can be applied to, for example, a capacitive pressure sensor. The diaphragm structure comprises a semiconductor substrate serving as a supporting portion, for example, a silicon substrate 11, a cavity portion 12 formed in the silicon substrate 11, and a silicon oxynitride film 13 supported on one surface of the silicon substrate 11 so as to cover the cavity portion 12 on the side of the one surface of the silicon substrate 11. The silicon oxynitride film 13 has a thickness of about 2 μm, and it can vibrate by the pressure difference on the opposite sides of the film.

Figures 2A, 2B, 2C:
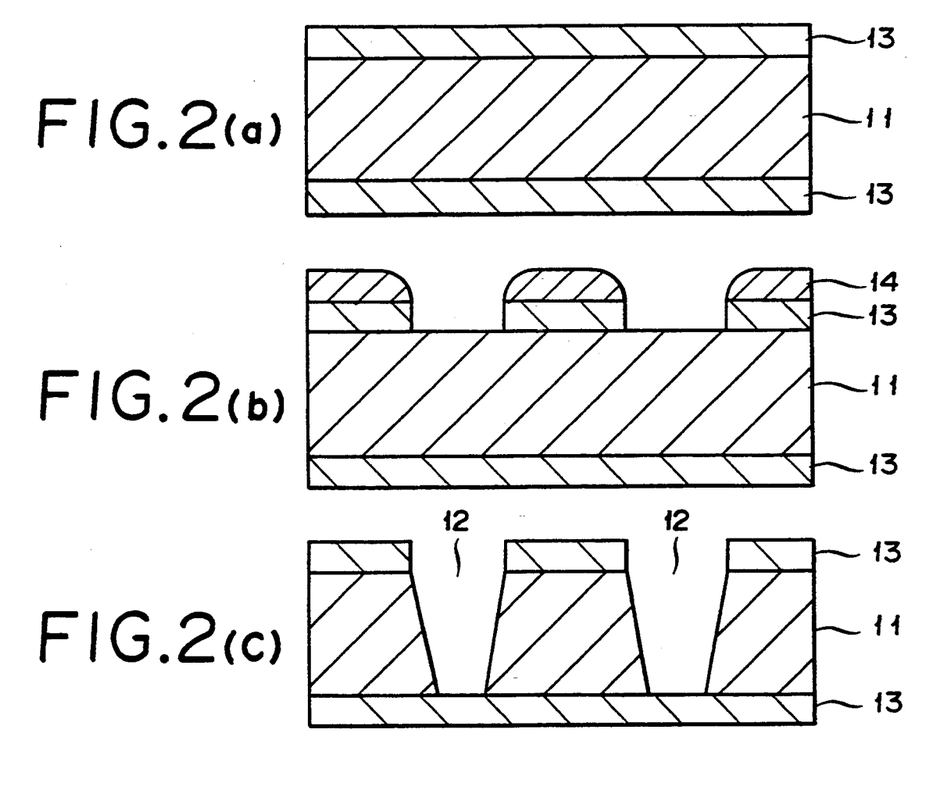
FIGS. 2(a) to 2(c) are cross sections illustrating a process for the production of the diaphragm structure of FIG. 1.

FIGS. 2(a) to 2(c) illustrate a process for the production of the diaphragm structure of FIG. 1. First, a silicon substrate 11 of a plane orientation (110) was prepared as shown in FIG. 2(a). This silicon substrate 11 may also have a plane orientation (100) or other plane orientations in accordance with the purpose for use of the semiconductor device. Then, silicon oxynitride films (SiOxNy) 13 having a thickness of 2 μm were formed on the both surface of the silicon substrate 11 by the plasma CVD method. That is, the chemical vapor deposition of the silicon oxynitride was performed for 20 minutes by heating the silicon substrate 11 to a temperature of 450° C. and by supplying monosilane ($SiH_4$) at a flow rate of 15 SCCM, nitrogen ($N_2$) at a flow rate of 203 SCCM and nitrous oxide ($N_2O$) at a flow rate of 32 SCCM as reaction gases, under an operating pressure of 0.45 torr and a high-frequency output of 400W as conditions for the formation of the film.

Then, after forming a pattern of a photoresist film 14 on the silicon oxynitride film 13 formed on the upper surface of the silicon substrate 11, a pattern of a cavity portion 12 as shown in FIG. 2(b) was formed by patterning the silicon oxynitride film 13 using the photoresist film 14 as a mask by the wet etching method and/or by the dry etching method. Furthermore, the etching of the silicon oxynitride film 13 can be easily and accurately performed by the use of a buffered hydrofluoric acid (e.g. $NH_4F:HF=6:1$) or a dry etching device, such as a reactive ion etching device. The photoresist film 14 was removed after the etching of the silicon oxynitride film 13 was completed.

Subsequently, the silicon substrate 11 was anisotropically etched from above using the patterned silicon oxynitride film 13 as a mask. An aqueous hydrazine solution was used as an etchant. This etching reaction is stopped when the etched portion reaches the boundary between the silicon substrate 11 and the silicon oxynitride film 13. Therefore, the etching can be automatically completed, so that it is possible to form the cavity portion 12 accurately.

By the process as described above, the diaphragm structure as shown in FIG. 1 was fabricated. In this embodiment, about 320 diaphragm structures were formed on a 3-inch wafer. Hardly any structures were broken during the fabrication, and it was found that the method of the invention can remarkably increase the yield of the structures as compared with the conventional methods.

Figure 4:
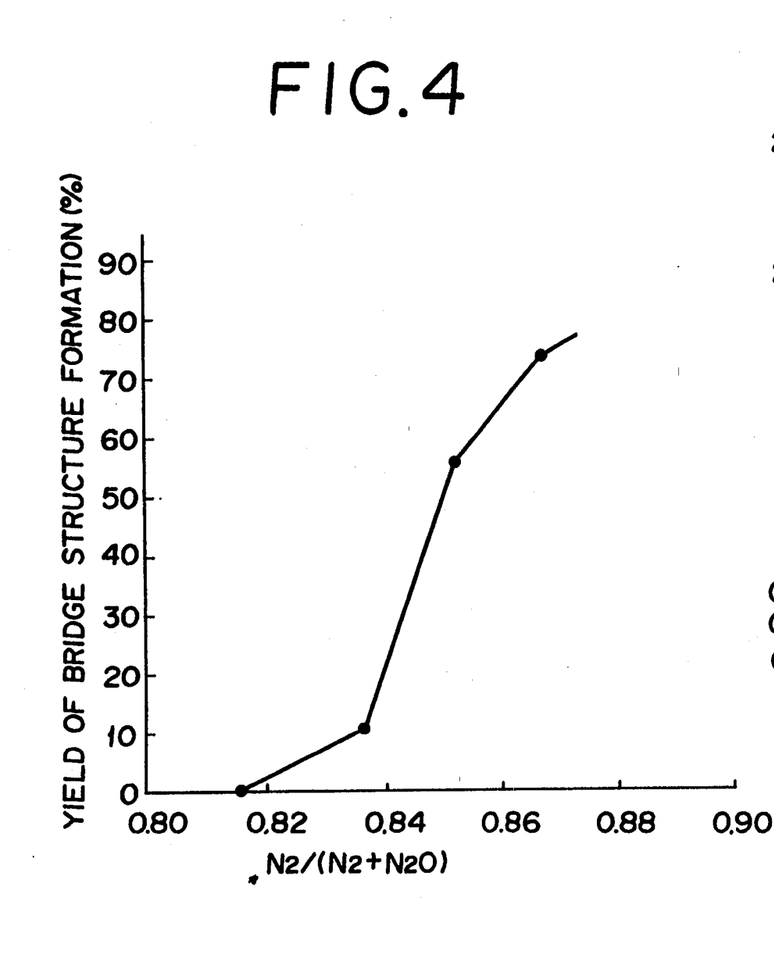

Further the experiments were carried out by shifting the ratio of $N_2/(N_2+N_2O)$ to obtain a result shown in FIG. 4. As being clear from FIG. 4, the ratio of $N_2/(N_2+N_2O)$ in the range of 0.86 to 0.88 gives the best yield, but if it exceeds 0.88, when the wafer is anneald at a high temperature, the wafer obtained bends, so the bridge structure is not formed.

Figure 5:
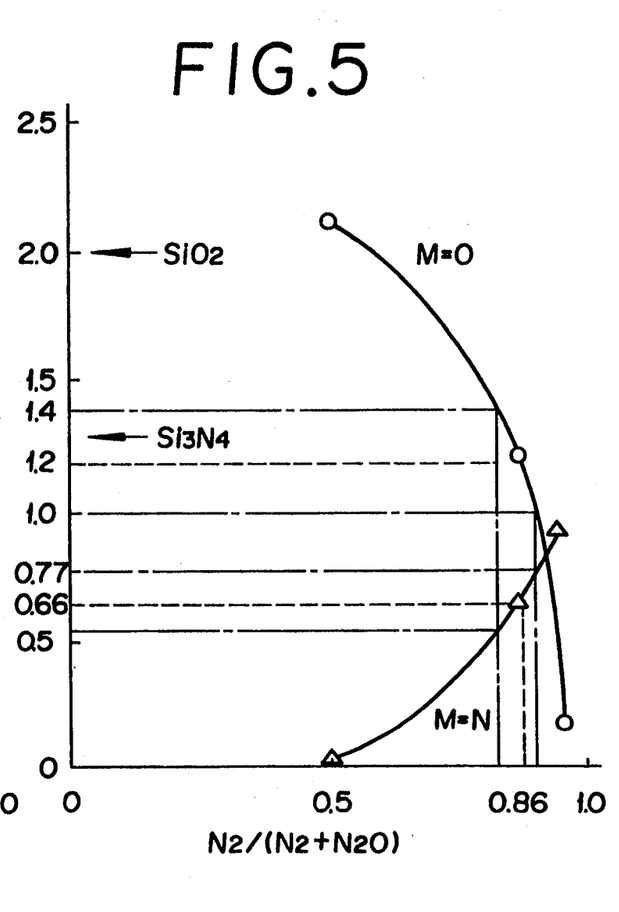

Further the composition of SiOxNy film analysed by RBS method is shown in FIG. 5.

As mentioned above, in the semiconductor device of the present invention, a silicon oxynitride film having an ideal stress balance is applied to a three-dimensional structure, such as a diaphragm and a bridged structure, so that a stable structure can be formed. The composition of the silicon oxynitride film is set in accordance with the composition of the supporting portion, so that the optimum film composition can be obtained. Furthermore, since the etching is designed to accurately stop on the boundary between the silicon oxynitride film and the semiconductor substrate, the accuracy of processing can be improved, and the yield of production of the semiconductor device can be simplified. The composition of the silicon oxynitride film can be controlled by varying the flow rate ratio of the reaction gases, so that the optimum condition for the formation of the film can be obtained, and the yield can be improved. In a case where the semiconductor device of the present invention is applied to an element or a sensor using vibration, it is possible to select the tension of a vibrating member, and to vary natural frequency thereof.

What is claimed is:

1. A semiconductor device comprising:
   a supporting portion made of a semiconductor material;
   a cavity portion formed in said supporting portion so as to be surrounded by said supporting portion; and
   a silicon oxynitride film supported on one surface of said supporting portion so as to cover said cavity portion on a side of said one surface, wherein said silicon oxynitride has a composition expressed by the following formula SiOxNy, wherein x is 1 to 1.4, y is 0.56 to 0.77 and x+y<2.

2. A semiconductor device asset forth in claim 1, wherein composition of said silicon oxynitride film is selected in accordance with the material of said supporting portion.

3. A semiconductor device comprising:
   a supporting portion made of a semiconductor material;
   a cavity portion formed in said supporting portion so as to be surrounded by said supporting portion; and
   a silicon oxynitride film supported on one surface of said supporting portion and so arranged as to form a bridged structure over said cavity portion;
   wherein composition of said silicon oxynitride film is selected in accordance with the material of said supporting portion, wherein said silicon oxynitride has a composition expressed by the following formula SiOxNy, wherein x is 1 to 1.4, y is 0.56 to 0.77 and x+y<2.

* * * * *

UNITED STATES PATENT AND TRADEMARK OFFICE
CERTIFICATE OF CORRECTION

PATENT NO. : 5,382,823
DATED : January 17, 1995
INVENTOR(S) : Komatsu et al.

It is certified that error appears in the above-indentified patent and that said Letters Patent is hereby corrected as shown below:

Column 1, line 22, change "in" (first occurrence) to --In--;
        line 24, change "abridged" to --a bridged--;
        line 42, change "however" to --However--.

Column 3, between lines 12 and 13, insert:

--Fig. 4, is a graph showing a relationship between the $N_2/(N_2+N_2O)$ ratio and yield of bridged structure formation, and--;

line 13, change "FIG.4is" to --FIG. 5 is--.

Column 4, line 40, change "$(N_2/N_2+N_2))$" to --$(N_2/(N_2+N_2O))$--;

line 68, change "as" to --gas--.

UNITED STATES PATENT AND TRADEMARK OFFICE
CERTIFICATE OF CORRECTION

PATENT NO. : 5,382,823
DATED : January 17, 1995
INVENTOR(S) : Komatsu et al.

It is certified that error appears in the above-indentified patent and that said Letters Patent is hereby corrected as shown below:

Column 6, line 21 and 22, after "be" delete:

and insert --. In a case where the silicon oxynitride film is used as the etching resistant film during the formation of the cavity portion, the production process can be simplified.--;

Column 6, line 43 (claim 2), change "asset" to --as set--.

Signed and Sealed this

Eighteenth Day of February, 1997

Attest:

BRUCE LEHMAN

Attesting Officer

Commissioner of Patents and Trademarks

UNITED STATES PATENT AND TRADEMARK OFFICE
CERTIFICATE OF CORRECTION

PATENT NO. : 5,382,823
DATED : January 17, 1995
INVENTOR(S) : Komatsu et al.

It is certified that error appears in the above-indentified patent and that said Letters Patent is hereby corrected as shown below:

Column 1, line 22, change "in" (first occurrence) to --In--;
         line 24, change "abridged" to --a bridged--;
         line 42, change "however" to --However--.

Column 3, between lines 12 and 13, insert:

--Fig. 4, is a graph showing a relationship between the $N_2/(N_2+N_2O)$ ratio and yield of bridged structure formation, and--;

line 13, change "FIG. 4" to --FIG. 5--.

Column 4, line 40, change "$(N_2/N_2+N_2))$" to --$(N_2/(N_2+N_2O))$--;

line 68, change "as" to --gas--.

UNITED STATES PATENT AND TRADEMARK OFFICE
CERTIFICATE OF CORRECTION

PATENT NO. : 5,382,823
DATED : January 17, 1995
INVENTOR(S) : Komatsu et al.

It is certified that error appears in the above-indentified patent and that said Letters Patent is hereby corrected as shown below:

Column 6, line 22, after "be" insert

--improved. In a case where the silicon oxynitride film is used as the etching resistant film during the formation of the cavity portion, the production process can be--;

Column 6, line 43 (claim 2), "asset" should be --as set--

This certificate supersedes Certificate of Correction issued February 18, 1997.

Signed and Sealed this

Twenty-ninth Day of July, 1997

Attest:

BRUCE LEHMAN

*Attesting Officer*          *Commissioner of Patents and Trademarks*